United States Patent [19]
McNair, Jr.

[11] Patent Number: 5,888,134
[45] Date of Patent: Mar. 30, 1999

[54] EXTERNAL TO INTERNAL LAPTOP COMPUTER AND VIDEO GAME CONSOLE

[76] Inventor: Neil Archie McNair, Jr., P.O. Box 42, Ramsey, N.J. 07446

[21] Appl. No.: 852,552

[22] Filed: May 7, 1997

[51] Int. Cl.[6] ................................................ H05K 7/20
[52] U.S. Cl. .................... 454/184; 55/385.6; 361/695; 361/697
[58] Field of Search .................... 55/385.4, 385.6, 55/467; 361/695, 696, 697; 454/184

[56] References Cited

U.S. PATENT DOCUMENTS

| | | | |
|---|---|---|---|
| 4,103,737 | 8/1978 | Perkins | 361/695 X |
| 4,383,286 | 5/1983 | Hicks | 361/695 |
| 4,710,851 | 12/1987 | Pastecki | 361/695 X |
| 4,751,872 | 6/1988 | Lawson, Jr. | 454/184 |
| 5,713,790 | 2/1998 | Lin | 454/184 |
| 5,725,622 | 3/1998 | Whitson et al. | 454/184 X |

FOREIGN PATENT DOCUMENTS 6-164175  6/1994  Japan ...................................... 361/695

*Primary Examiner*—Harold Joyce

[57] ABSTRACT

A machine device that forces filtered air into and through a CD ROM video game consoles aeration vents, thereby ventilating and cooling a CD ROM video game console's heat generating interior components while subsequently absorbing heat away from the subject console's plastic cabinet. This process allow for a more efficient ventilating and cooling process. Additionally, the cooling machine device would permit a user to operate his video game console normally, even while the cooler is performing. A cooling device that's small and light weight so that even a youngster could install, remove and handle without feeling intimidated.

9 Claims, 3 Drawing Sheets

TOP VIEW

LEFT SIDE VIEW

FRONT VIEW

RIGHT SIDE VIEW

BOTTOM VIEW

EXTERNAL TO INTERNAL LAPTOP COMPUTER AND VIDEO GAME CONSOLE

FIELD OF INVENTION

This invention relates in general to the filtered air cooling of the electrical processing, and laser producing components of CD ROM, video game consoles. In particular the interior cooling of CD ROM video game consoles from an outside enclosed source.

BACKGROUND OF THE INVENTION

CD ROM Video Game Console during normal usage generate heat from their electrical processing and laser producing components. However, due to the small size of the Video Game Console's cabinet the heat quickly builds to excessive levels.

Further adding to this is the fact that CD ROM Video Game Consoles are generally played by youngsters, for extended periods. Even adults enjoy the advanced puzzle solving, sports and adventure games for extended periods. The build-up of heat due to the extended playing period, produce the undesirable effect of LOCK UP and SKIPPING. That is the CD ROM quits reading the game disc properly. Growing consumer complaints show that excessive fuse burnout is another undesirable effect of the excess heat.

Manufactures have tried to address the problem by making aeration vents on three sides of the Video Game Consoles' cabinet, this however, has proved inadequate.

Manufactures of CD ROM Video Game Consoles would like to keep the size of the consoles cabinet as small and lightweight as possible, and it is the small size and cost considerations that have kept manufacture from installing internal cooling devices.

CD ROM Video game users would greatly benefit from a simple device that is easy to use, install and remove. This device is lightweight and would cool their CD ROM game console even during extended play periods. Thereby, helping to avoid the undesirable effects from excess heat build up.

DESCRIPTIONS OF THE PRIOR ART

In order to provide information so that the invention maybe further understood and appreciated in its proper contexts, reference is now made to prior art U.S. Pat. No. 5,546,272.

U.S. Pat. No. 5,546,272 a assigned to Dell USA a discloses a method for blowing air throughout the chassis of a computer system. However the significant and unique needs of the video game console and video game user are not being devoted to. For a CD ROM video game console, my invention further advances the prior noted art, and fulfills the unique needs of the video game console and console user. For example, the hard plastic that forms the video game console cabinet traps and holds heat. This fact along with the video game console's cabinet, small compact size allow for excessive heat build up. This invention comprises a heat absorbing material in its envelope receptacle and its ventiduct exchange port. To capture and radiate heat away form the video game console's cabinet. There by allowing for a more efficient cooling ventilation device. Additionally manufactures of CD ROM video game consoles caution users against excessive dust, because it may impair the video game console's proformance. Therefore any air ventilating throughout the console's cabinets, from outside such cabinet, should be sanitize of dust. The air filtering device comprised in this invention, addresses that concern. Another need unique to video game console users, is that any peripheral add on should be non intimidating, almost toy like since a good number of video game console users are youngsters. The unique features of this invention that address these and additional needs, will be made apparent in the summary.

Whatever the precise merits, features and advantages of the above cited reference, none of them achieves or fulfills the purposes of the external to internal filtered air cooler, for CD ROM video game consoles and console users.

SUMMARY OF THE INVENTION

The principal object of the present invention is to provide the CD ROM Video Game Console user, a method to cool his Video Game Console without the inconvenience associated with sending the console to a manufacture for the installation of a costly interior cooling unit. However, as already noted the small compact size of most CD ROM Video Game Consoles renders this procedure impossible.

Another object is to force filtered cooled air into and through the subject Video Game Consoles side aeration vents from a protected sanitized environment. This is accomplished by enclosing a small portion of the width of the subject Video Game Console, including an entire bank of side aeration vents into the ventiduct exchange port of the invented cooler.

A further object is to provide the CD ROM Video Game Console user with a device that's easy to use, easy to install and remove, provide utility so a Video Game Console can be played and used normally, even while the invented cooler is operating. Lightweight and small so that cooler can be carried by a youngster. Provide an easy to follow air filter change procedure, so that even a youngster can understand it.

The fore-mentioned objects can be accomplished by the primary features of this invention. An envelope receptacle, preferably rectangular in shape, comprising of a ventiduct exchange port running the width of the envelope receptacle on the front side. To accommodate a portion of the subject game console's cabinet along with its side aeration vents. One or more accommodating perforations along the side and top edges to allow a user access to a CD ROM game console's off-on, and reset buttons. One or more ventilating devices to pull air in through air intake screens, filters and openings. Then push filtered air through the envelope receptacles interior and ventiduct exhange port, and subsequently into and through the video game console cabinet's eration vents. The resulting river of air bathes and cools the subject game consoles interior heat generating components. Any remaining heated air is pushed out of the subject console's cabinet opposite aeration vents by the continuing air flow. Additionally, heat absorbing material lining the ventiduct exchange port and the envelope receptical, absorbs heat away from the subject video console's plastic cabinet.

To remove cooler, a user simply pulls the small portion of the video game console's cabinet out of the coolers ventiduct exchange port.

Filters can be changed by removing the fasteners along the air intake openings. The fasteners anchor both the air intake screens and filters over the air intake openings and to the cooling units envelope receptacle.

BRIEF DESCRIPTION OF THE DRAWINGS

Reference is now made to the following descriptions taken in conjunction with the accompanying drawing in which.

DETAILED DESCRIPTION OF THE PREFERRED EMBODIMENTS

Figure 2:
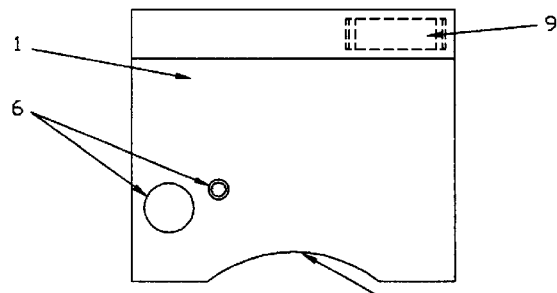
FIG. 2 is a top view of the envelope receptacle showing two accommodating perforations over the ventiduct exchange port.
Figure 3:
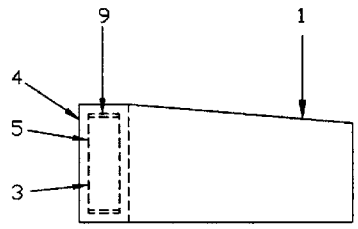
FIG. 3 is a left side view of the envelope receptacle.
Figure 1:
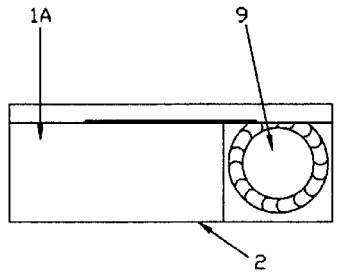
FIG. 1 is a front view looking through and into the ventiduct exchange port and the interior of the envelope receptacle.
Figure 4:
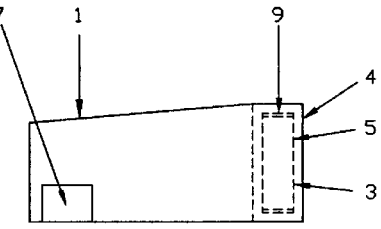
FIG. 4 is a right side view of the envelope receptacle.
Figure 5:
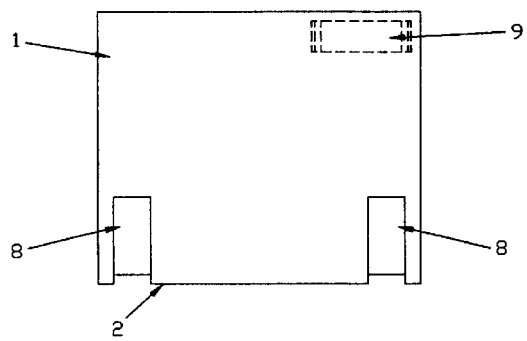
FIG. 5 is a bottom view of FIG. 2.

Referring now to the drawing for a better understanding of the invention. FIG. 1 is a front view looking in through the ventiduct exchange port 2 and into the envelope receptacles interior 1a. This is where a portion of a subject CD ROM video game console cabinet would fit firmly in the ventiduct exchange port 2, and into the envelope receptacles interior 1a. Also shown in FIG. 1 is the most preferred embodiment of a ventilating device 9. FIG. 2 is a top view of the envelope receptacles 1 and the ventiduct exchange port 2. Also shown are two accommodating perforations 6. Their function to be better appreciated will be discussed later in the COUPLING description. FIG. 3 is the preferred embodiment for the air intake port 3, removable screen 4, and the exchangeable air filtering devices 5. There relationship to one another to be better appreciated will be discussed later in the COUPLING description and their functions in the OPERATIONS descriptions. Also shown in relation to one another, is the envelope receptacle 1 and the ventiduct exchange port 2. FIG. 4 is a right side view of FIG. 3, also shows is an accommodating perforation 7. Its function to be better appreciated will be discussed in the COUPLING description. FIG. 5, is a bottom perspective of FIG. 2. Shown in FIG. 5 are two unique accommodating perforation 8. They serve to accommodate the underside configurations of an engaged subject video game console cabinet. Also shown is the bottom lining of the heat absorbing material T. Its function to be better appreciate will be discussed in the OPERATION description. Also shown is the underside of the envelope receptacle 1, and the ventilator device 9.

COUPLING DESCRIPTIONS

Figure 6:
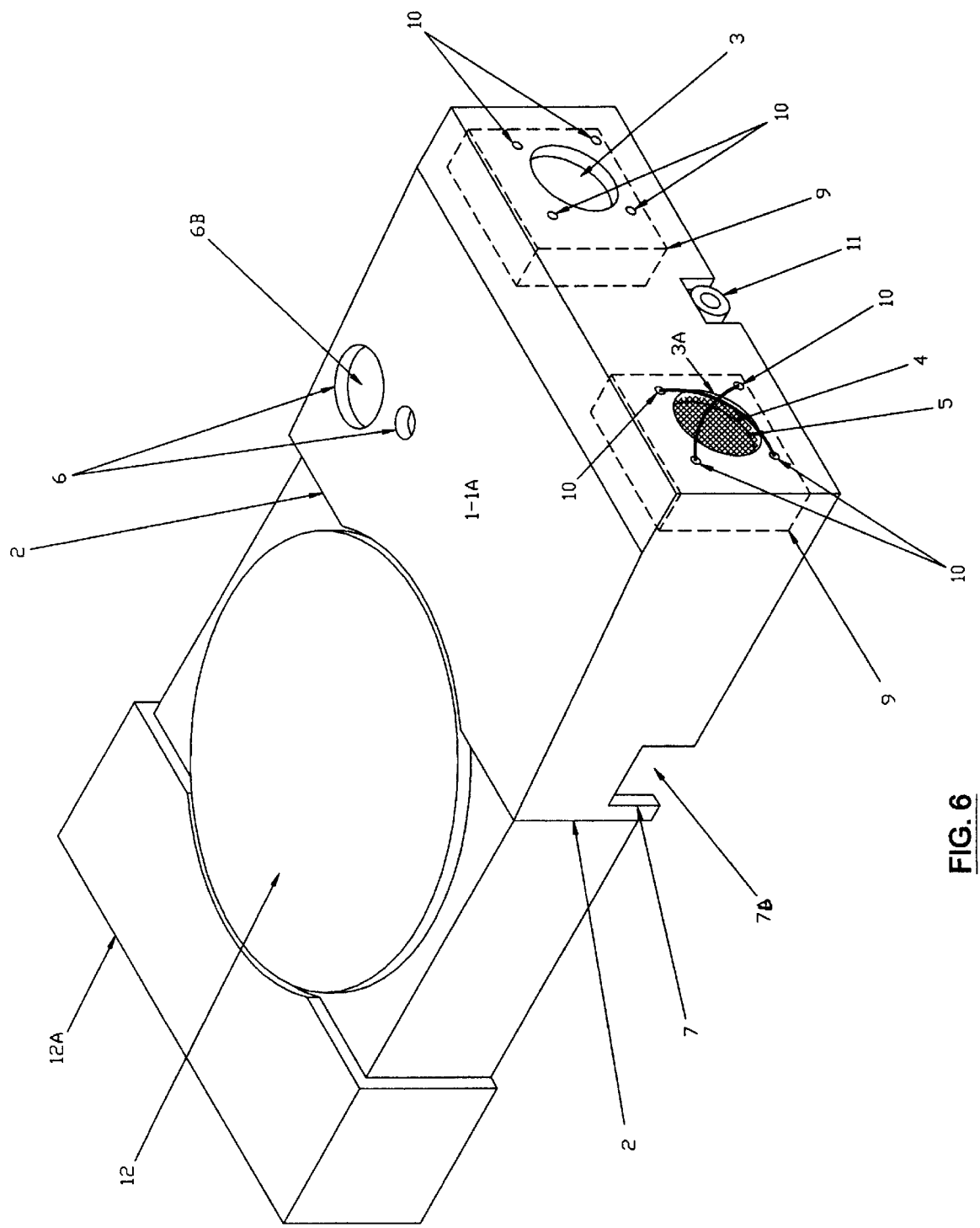
FIG. 6 is a left angle view of the invention, attached to a typical CD ROM Video Game Console.
Figure 7:
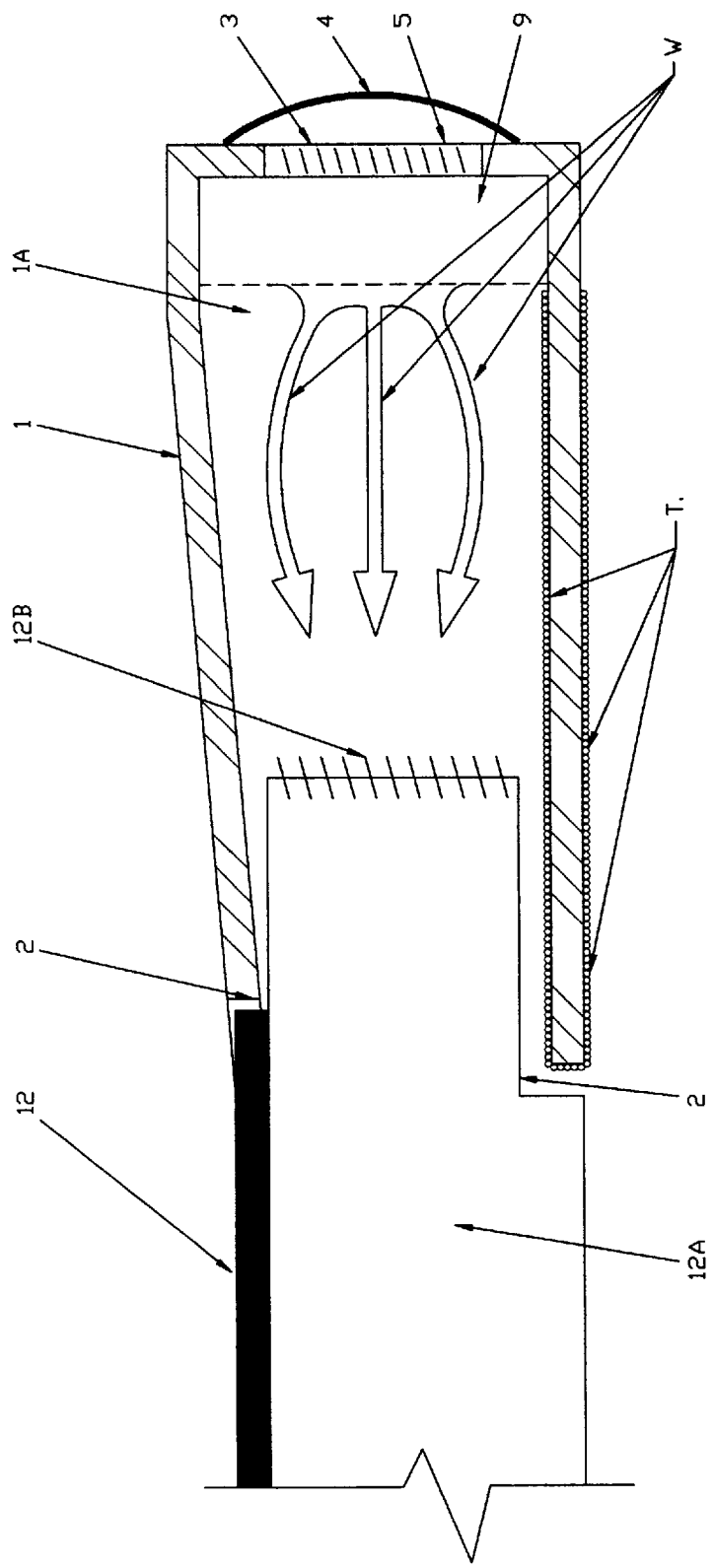
FIG. 7 is a cross-sectional view showing the pathway of air inside the receptacle envelope, during the normal uses of the cooling device.

Referring to FIG. 7, 12a and FIG. 6, which is the preferred embodiment for use of the invention, in which a typical video game console 12a is attached therein to the cooling device invention FIG. 7 via the ventiduct exchange port 2. A video game console's cabinet 12a is pushed in through the ventiduct exchange port 2, into the envelope receptacle 1, and is advanced up to the subject console's cabinet CD cover 12. Accommodating perforations 6, on the top side of the ventiduct exchange port 2, allow a user access to the subject video game consoles 12a reset and power buttons 6b. While a right side accommodating perforation 7 allow a user access to the subject video game console FIG. 7 12a, a/c power supply 7b. The aforementioned accommodating perforations, permits a user to play his video game console 12a, while the cooling device is being used.

FIG. 6 further shows the preferred embodiment for the, air ventilating devices 9, and power supply 11. The ventilating devices 9 pulls air in through the air intake ports 3, and 3a with 3a depicting and intake removable screen 4, and a exchangeable air filtering device 5. Intake removable screens 4, and exchangeable air filtering device 5, are fastened to the envelope receptacle 1 via the filter and screen fasteners 10. This design allows for a quick, easy and non-intimidating air filter exchange. A design even a youngster could understand.

OPERATION

FIG. 7 depict how the different components relates to each other from inside the ventiduct exchange port 2 and the envelope receptacles interior 1a, in-conjunction with a continuous flow of filtered air, W. During normal use of the invention, a video game console's cabinet 12a is inserted in through the ventiduct exchange port 2 and come to rest inside the envelope receptacle 1a, and onto the heat absorbing material, T, which line the ventiduct exchange port 2, and the envelope receptacle interior 1a. Any heat build-up inside the plastic video game console cabinet 12a, is captured by the heat absorbing material, T which is also being ventilated and cooled by the filtered air flow W from the air ventilating devices 9. The ventilating devices 9 pull air in through the air intake port 3, intake removable screens 4 and exchangeable air filtering devices 5. The ventilating devices 9 then push filtered air into the envelope receptacles interior 1a thereby subsequently ventilating and cooling the heat absorbing material T. Filtered air W is then pushed forward into and through the subject video game console's cabinet side aeration vents 12b. The continuing river of air W bathes, ventilates and thereby cool the heat generating components inside the subject video game console 12a, and exits out of the subject game console's cabinets opposite aeration vents.

I claim:

1. A cooling ventilating device for a video game console, the console having a cabinet with aeration vents formed therein comprising:

a. an enveloped receptacle, forming a ventiduct;

b. at least one air-intake port means formed on said enveloped receptacle so that air can pas into said envelope receptacle;

c. at least one screen means for the screening of foreign objects in communication with said air-intake port means;

d. at least one air filter disposed downstream of the screen means for the sanitizing of air flowing through said envelope receptacle;

e. at least one air ventilating device means for ventilating air through said air intake port, into said enveloped receptacle, and through the video game console cabinet's aeration vents, while a portion of said video game console cabinet, and said aeration vents are secured within said via the ventiduct;

f. at least one ventiduct exchange port opening of an predetermined girth, with walls means to accommodate said subject video game console's cabinet, and it's exposed aeration vents, part-way within said envelope receptacle, further means for said machine device and said subject game console's cabinet to dock together securely, as a single larger cabinet, without the necessity for screws, extending fingers, or locking tongues means.

2. The ventilation device of claim 1, wherein said ventiduct further comprising heat absorbing material, for absorbing heat away from said subject cabinet.

3. The ventilation device of claim 1, wherein said cabinet further having accommodating perforations means, so that a user can access the console's command buttons and ports.

4. The ventilation device of claim 1, wherein said at least one air filter is exchangeable.

5. The ventilation device of claim 1, wherein said screen means is removable.

6. The ventilation device of claim 1, wherein said machine device is constructed of ABS plastic.

7. A cooling ventilating device for video game console, the console a having a cabinet with aeration vents formed therein comprising:

a. an envelope receptacle forming a ventiduct;

at least one air-intake port means formed on said envelope receptacle so that air can pass into said envelope receptacle;

c. at least one screen means for the screening of foreign objects in communication with said air-intake port means;

d. at least one ventilating device means disposed downstream of the screen means; for the ventilating air through said air-intake port, into said envelope receptacle and through the video game console e. cabinet's aeration vents when a portion of said video game console's f. cabinet and said aeration vents are secured therein.

8. The cooling ventilating device of claim 7, wherein said screen means is removable.

9. The cooling ventilation device of claim 7, wherein said device further comprising accommodating perforation means.

\* \* \* \* \*

UNITED STATES PATENT AND TRADEMARK OFFICE
CERTIFICATE OF CORRECTION

PATENT NO. : 5,888,134
DATED : March 30, 1999
INVENTOR(S) : McNair Jr.

It is certified that error appears in the above-identified patent and that said Letters Patent is hereby corrected as shown below:

Column 6, line 8, before "cabinet's" delete --e.--.

Column 6, line 10, before "cabinet's" delete --f.--.

Signed and Sealed this

Fifteenth Day of June, 1999

Attest:

Q. TODD DICKINSON

*Attesting Officer*          *Acting Commissioner of Patents and Trademarks*